US006491113B1

(12) United States Patent
Heinrichs

(10) Patent No.: US 6,491,113 B1
(45) Date of Patent: Dec. 10, 2002

(54) PISTOL AIR TOOL HAVING A FLAT TILT VALVE

(75) Inventor: Kevin Heinrichs, Lopatcong, NJ (US)

(73) Assignee: Ingersoll-Rand Company, Woodcliff Lake, NJ (US)

(*) Notice: Subject to any disclaimer, the term of this patent is extended or adjusted under 35 U.S.C. 154(b) by 0 days.

(21) Appl. No.: 09/578,018

(22) Filed: May 24, 2000

(51) Int. Cl.[7] ................................................ B23B 45/00
(52) U.S. Cl. ........................ 173/169; 173/168; 173/170
(58) Field of Search ................................ 173/169, 155, 173/168, 170; 251/298, 303

(56) References Cited

U.S. PATENT DOCUMENTS 3,827,635 A 8/1974 Krakowski et al.
4,080,105 A 3/1978 Connell
4,258,799 A * 3/1981 Eckman ................. 137/630.15
4,658,869 A 4/1987 Soon-Fu
4,712,983 A 12/1987 Moynihan
4,778,015 A * 10/1988 Jacobsson ................... 173/169
4,872,492 A 10/1989 McAnally et al.
5,180,019 A * 1/1993 Thiry et al. ................. 173/168
5,228,523 A * 7/1993 Rahm ......................... 173/169
5,855,222 A 1/1999 Jou
5,876,526 A 3/1999 Hamade et al.
5,901,794 A * 5/1999 Schoeps et al. ............. 173/169
5,913,370 A * 6/1999 Chapelle et al. ............ 173/169
5,931,207 A 8/1999 Gianino

* cited by examiner

*Primary Examiner*—Scott A. Smith
*Assistant Examiner*—Nathaniel Chukwurah

(57) ABSTRACT

A flat tilt valve for a pistol air tool, such as a pistol air screwdriver, which includes a flat tilt valve which is actuated substantially parallel to the sealing face of the flat tilt valve and which is positioned at the rear of the pistol air tool upstream of the air vane motor to create a common air path. Such a design allows the use of multiple air inlets in the same pistol air tool and makes it easy to mold or cast air inlets from both the bottom and the top and, if desired, the rear of the pistol air tool. The reconfiguration of the actuation rod on the tilt valve for a pistol air tool provides a slender profile and minimizes the overall length of the pistol air tool.

20 Claims, 3 Drawing Sheets

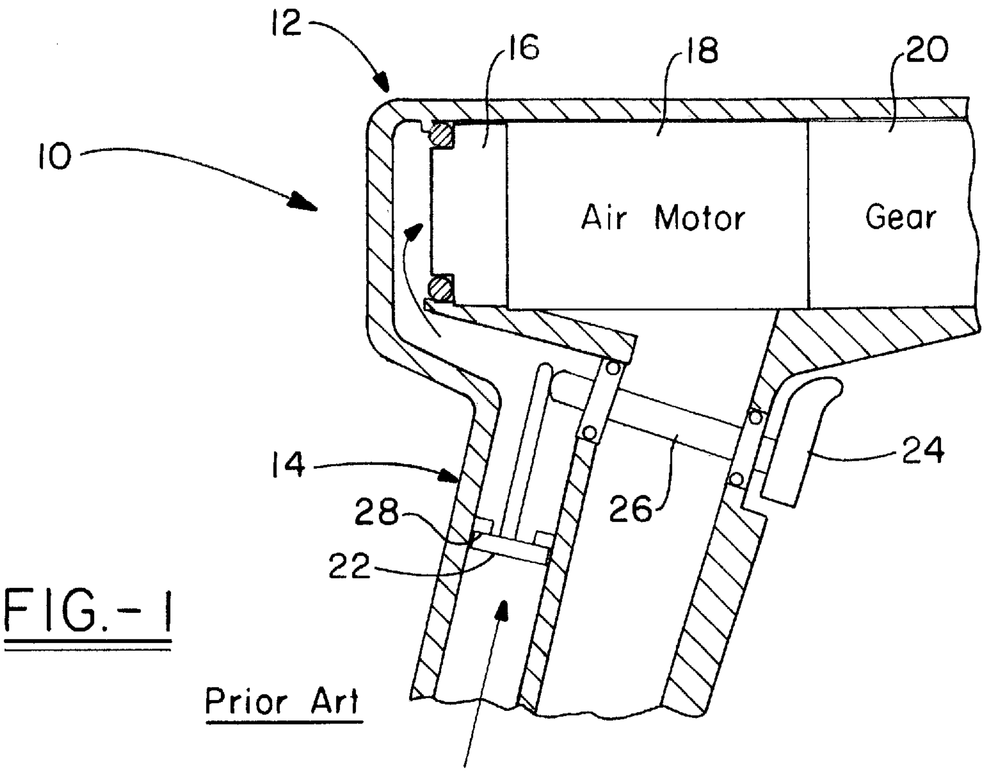
FIG.-1
Prior Art
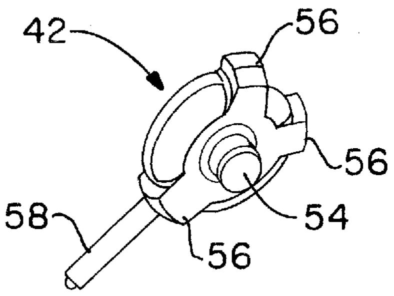
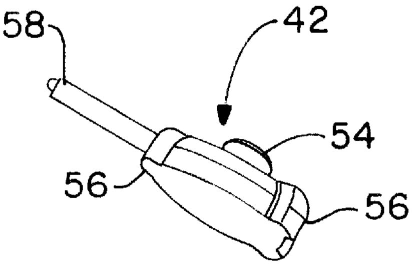
FIG.-4
FIG.-5
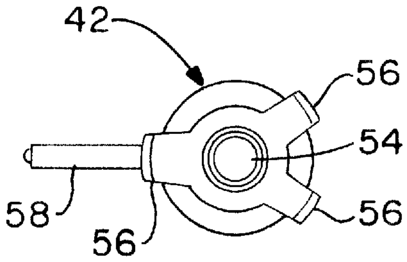
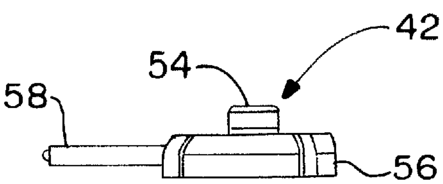
FIG.-6
FIG.-7

PISTOL AIR TOOL HAVING A FLAT TILT VALVE

BACKGROUND AND SUMMARY OF THE INVENTION

The present invention relates generally to a pistol air tool having a flat tilt valve. More particularly, the present invention relates to a pistol air tool such as, for example, a pistol air screwdriver, having a flat tilt valve which is actuated substantially parallel to the sealing face of the flat tilt valve and which is positioned at the rear of the pistol air tool upstream of the air vane motor to create a common air path.

Current known pistol air tool designs control incoming air using a tilt valve. The actuation lever for such known prior art pistol air tool tilt valves is typically positioned substantially perpendicular to the sealing face of the tilt valve and substantially parallel to the flow path of the air. Such a design has been effective when the tilt valve is positioned in the handle of the pistol air tool. This design has also been effective in pistol air tools with top air inlets when the tilt valve is moved to the top of the pistol air tool. However, one disadvantage of this design is that it is difficult to arrange both top and bottom controlled air inlets without complex air passages and ports. Such complex air passages and ports are difficult to cast or mold and generally experience a significant decrease in performance due to air flow losses.

Accordingly, an object of the present invention is the provision of a pistol air tool having a flat tilt valve which utilizes multiple air inlets in a pistol air tool and has a relatively simple compact housing design.

Another object of the present invention is to provide a pistol air tool having a flat tilt valve which provides greater performance for the pistol air tool.

Yet another object of the present invention is to provide a pistol air tool having a flat tilt valve which reduces air flow losses.

These and other objects of the present invention are attained by the provision of a pistol air tool such as, for example, a pistol air screwdriver, having a flat tilt valve which is actuated substantially parallel to the sealing face of the flat tilt valve and which is positioned at the rear of the pistol air tool upstream of the air vane motor to create a common air path. Such a design allows the use of multiple air inlets in a pistol air tool and makes it easy to mold or cast air inlets from both the bottom and the top, as well as, if desired, the rear, of the pistol air tool. The reconfiguration of the actuation rod on the flat tilt valve provides a slender profile and reduces the overall length of the pistol air tool.

Other advantages and novel features of the present invention will become apparent in the following detailed description of the invention when considered in conjunction with the accompanying drawings.

BRIEF DESCRIPTION OF THE DRAWINGS

FIG. 1 is a cross-sectional side elevational view of a representative prior art pistol air tool design having a tilt valve positioned substantially perpendicular to the sealing face of the tilt valve and substantially parallel to the flow path of the air.

FIG. 4 is a first perspective view of the flat tilt valve used in the pistol air tool having a flat tilt valve in accordance with a first preferred embodiment of the present invention shown in FIG. 2.

FIG. 5 is a second perspective view of the flat tilt valve used in the pistol air tool having a flat tilt valve in accordance with a first preferred embodiment of the present invention shown in FIG. 2.

FIG. 6 is a top plan view of the flat tilt valve used in the pistol air tool having a flat tilt valve in accordance with a first preferred embodiment of the present invention shown in FIG. 2.

FIG. 7 is a side elevational view of the flat tilt valve used in the pistol air tool having a flat tilt valve in accordance with a first preferred embodiment of the present invention shown in FIG. 2.

DETAILED DESCRIPTION OF THE DRAWINGS

Figure 2:
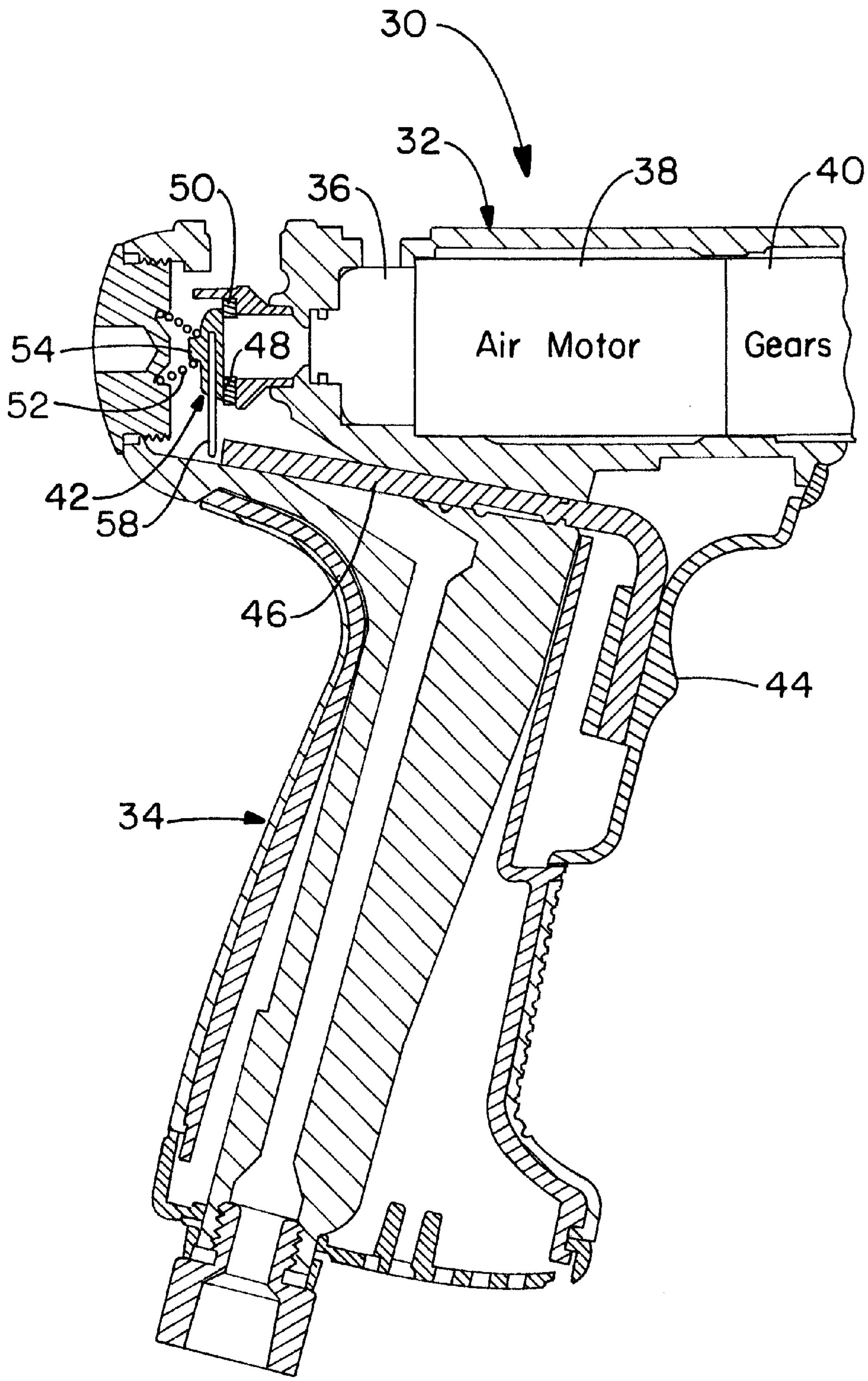
FIG. 2 is a cross-sectional side elevational view of a pistol air tool having a flat tilt valve in accordance with a first preferred embodiment of the present invention with the flat tilt valve in its closed or sealed position.

In the following detailed description of a first preferred embodiment and a second preferred embodiment of the present invention, reference is made to the accompanying drawings which, in conjunction with this detailed description, illustrate and describe a first preferred embodiment and a second preferred embodiment of a pistol air tool having a flat tilt valve in accordance with the present invention. Referring first to FIG. 1, which shows a cross-sectional side elevational view of a representative prior art pistol air tool design having a tilt valve positioned substantially perpendicular to the sealing face of the tilt valve and substantially parallel to the flow path of the air, representative prior art pistol air tool is generally identified by reference number 10. Representative prior art pistol air tool 10 generally includes housing 12 including handle portion 14 and optional rotary reverse section 16, air vane motor section 18 and gear section 20 positioned in the interior of housing 12. Incoming air is controlled in representative prior art pistol air tool 10 by tilt valve 22. Tilt valve 22 is typically biased to normally be in a closed or sealed position and is opened by depressing trigger 24 which displaces actuation rod 26 and opens tilt valve 22. Actuation rod 26 is typically positioned substantially perpendicular to sealing face 28 of tilt valve 22 and substantially parallel to the flow path of the air in representative prior art pistol air tool 10. Such a design has been effective when tilt valve 22 is positioned in handle portion 14 of representative prior art pistol air tool 10 as shown in FIG. 1. Such a design has also been effective in pistol air tools with top air inlets when the tilt valve is moved to the top of the pistol air tool. However, one problem with this design is that it is difficult to arrange both top and bottom controlled air inlets without complex air passages and ports. Such complex air passages and ports are difficult to cast or mold and generally experience a significant decrease in performance due to air flow losses.

Figure 3:
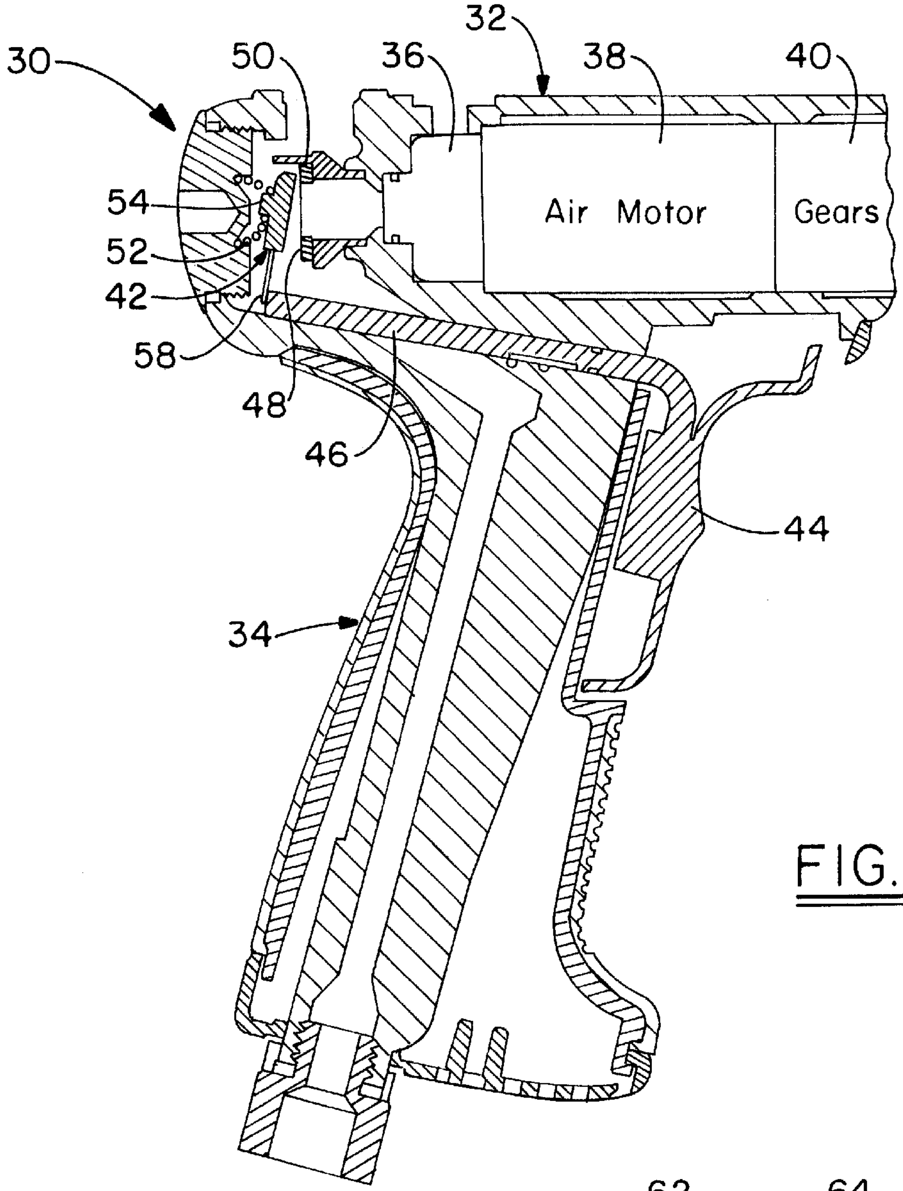
FIG. 3 is a cross-sectional side elevational view of the pistol air tool having a flat tilt valve in accordance with a first preferred embodiment of the present invention shown in FIG. 2 with the flat tilt valve in its open position.

Referring now to FIGS. 2 and 3, which show a cross-sectional side elevational view of a pistol air tool having a flat tilt valve in accordance with a first preferred embodiment of the present invention with the flat tilt valve in its closed or sealed position and a cross-sectional side elevational view of the pistol air tool having a flat tilt valve in accordance with a first preferred embodiment of the present invention shown in FIG. 2 with the flat tilt valve in its open position, respectively, a pistol air tool having a flat tilt valve in accordance with a first preferred of the present invention, generally identified by reference number 30, is shown. Pistol air tool having a flat tilt valve 30 includes housing 32 including handle portion 34 and optional rotary reverse section 36, air vane motor section 38 and gear section 40 positioned in the interior of housing 32. Incoming air is controlled in pistol air tool having a flat tilt valve 30 by flat tilt valve 42. Flat tilt valve 42 is typically biased to be in a normally closed or sealed position and is opened by depressing trigger 44 which displaces actuation rod 46 and opens flat tilt valve 42. Actuation rod 46 in flat tilt valve 42 is displaced in a direction substantially parallel to sealing face 48 and substantially perpendicular to the flow path of the air in pistol air tool having a flat tilt valve 30, rather than actuation rod 26 being displaced in a direction substantially perpendicular to sealing face 28 and substantially parallel to the flow path of the air as seen in FIG. 1 in representative prior art pistol air tool 10. Sealing face 48 preferably includes washer 50 fabricated from a resilient material, such as urethane, to seal with flat tilt valve 42. In addition, spring 52, most preferably a coil spring or a compression spring, one end of which is positioned over outwardly extending projection 54 on flat tilt valve 42 and the other end of which is positioned against the interior surface of housing 32, normally retains flat tilt valve 42 in a closed or sealed position. Flat tilt valve 42 is positioned at the rear of pistol air tool having a flat tilt valve 30 upstream of air vane motor section 38 to create a common air path. Such a design solves the problem of multiple air inlets in the same pistol air tool and makes it easy to mold or cast inlets from both the bottom and the top, as well as, if desired, the rear, of housing 32. The reconfiguration of actuation rod 46 on flat tilt valve 42 in accordance with the invention provides a slender profile and will reduce the overall length of pistol air tool having a flat tilt valve 30.

Referring to FIGS. 4 through 7, which show a first perspective view of the flat tilt valve used in the pistol air tool having a flat tilt valve in accordance with a first preferred embodiment of the present invention shown in FIG. 2, a second prespective view of the flat tilt valve used in the pistol air tool having a flat tilt valve in accordance with a first preferred embodiment of the present invention shown in FIG. 2, a top plan view of the flat tilt valve used in the pistol air tool having a flat tilt valve in accordance with a first preferred embodiment of the present invention shown in FIG. 2 and a side elevational view of the flat tilt valve used in the pistol air tool having a flat tilt valve in accordance with a first preferred embodiment of the present invention shown in FIG. 2, flat tilt valve 42 preferably includes a plurality of outwardly extending projections 56, three (3) of which are shown in FIGS. 4 through 7, around the perimeter of flat tilt valve 42. Flat tilt valve 42 also preferably includes downwardly extending arm 58 which contacts actuation rod 46 such that, when trigger 44 is depressed, flat tilt valve 42 is opened.

Figure 8:
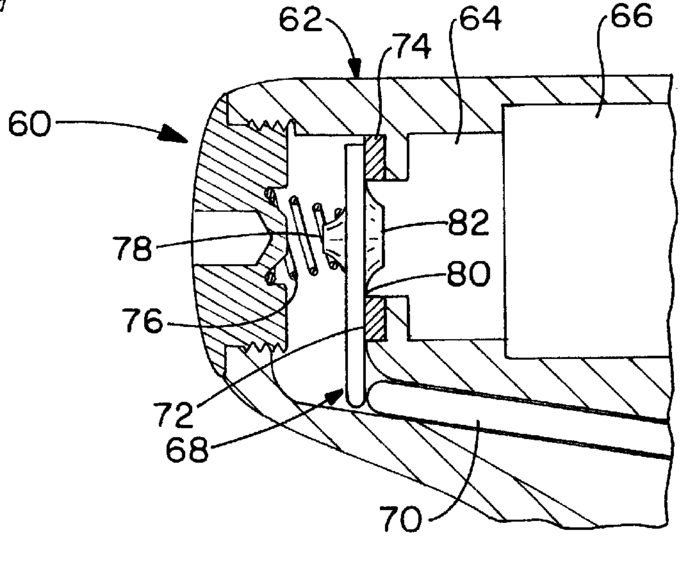
FIG. 8 is a cross-sectional detail partial side elevational view of a pistol air tool having a flat tilt valve in accordance with a second preferred embodiment of the present invention.

Referring to FIG. 8, which shows a cross-sectional detail partial side elevational view of a pistol air tool having a flat tilt valve in accordance with a second preferred embodiment of the present invention, a pistol air tool having a flat tilt valve in accordance with the second preferred of the present invention, generally identified by reference number 60, is shown. Pistol air tool having a flat tilt valve 60 generally includes housing 62 including handle portion (not shown) and optional rotary reverse section 64, air vane motor section 66 and gear section (not shown) positioned in the interior of housing 62. Incoming air is controlled in pistol air tool having a flat tilt valve 60 by flat tilt valve 68. Flat tilt valve 68 is typically biased to be in a normally closed or sealed position and is opened by depressing trigger (not shown) which displaces actuation rod 70 and opens flat tilt valve 68. Actuation rod 70 in flat tilt valve 68 is displaced in a direction substantially parallel to sealing face 72 and substantially perpendicular to the flow path of the air in pistol air tool having a flat tilt valve 60, rather than actuation rod 26 being displaced in a direction substantially perpendicular to sealing face 28 and substantially parallel to the flow path of the air as seen in FIG. 1 in representative prior art pistol air tool 10. Sealing face 72 preferably includes washer 74 fabricated from a resilient material, such as urethane, to seal with flat tilt valve 68. In addition, spring 76, most preferably a coil spring or a compression spring, one end of which is positioned over outwardly extending projection 78 on flat tilt valve 68 and the other end of which is positioned against the interior surface of housing 62, normally retains flat tilt valve 68 in a closed or sealed position. Flat tilt valve 68 is positioned at the rear of pistol air tool having a flat tilt valve 60 upstream of air vane motor section 66 to create a common air path. In addition, rear surface 80 of flat tilt valve 68 can include tapered portion 82, if desired, to facilitate air flow past flat tilt valve 68. Such a design solves the problem of multiple air inlets in the same pistol air tool and makes it easy to mold or cast inlets from both the bottom and the top, as well as, if desired, the rear, of housing 62. The reconfiguration of actuation rod 70 on flat tilt valve 68 in accordance with the present invention provides a slender profile and will minimize the overall length of pistol air tool having a flat tilt valve 60.

Thus, pistol air tool having a flat tilt valve 30 in accordance with a first preferred embodiment of the present invention and pistol air tool having a flat tilt valve 60 in accordance with a second preferred embodiment of the present invention allows multiple air inlets in a pistol air tool with a simple compact housing design. By simplifying the inlet passages, such pistol air tools will have increased performance, and equal performance from all air inlets, because air flow losses are reduced. In addition, multiple air inlets can be packaged in a relatively small compact pistol air tool.

Although the present invention has been described above in detail, the same is by way of illustration and example only and is not to be taken as a limitation on the present invention. It is apparent to those having a level of ordinary skill in the relevant art that other variations and modifications in a pistol air tool having a flat tilt valve in accordance with the present invention, as described and shown herein, could be readily made using the teachings of the present invention. Accordingly, the scope and content of the present invention are to be defined only by the terms of the appended claims.

What is claimed is:

1. A pistol air tool, comprising:

a housing having at least one air inlet and a downwardly extending handle portion;

a tilt valve positioned in the interior of said housing, said tilt valve is biased in a normally closed or sealed position against a sealing surface to block the flow of air into said pistol air tool and said tilt valve having a downwardly extending arm which is substantially parallel to said sealing surface; and a trigger including an actuation rod which is movable and in contact with said downwardly extending arm such that when said trigger is depressed, said tilt valve is opened to allow the flow of air into said pistol air tool.

2. The pistol air tool in accordance with claim 1, wherein said housing includes multiple air inlets.

3. The pistol air tool in accordance with claim 2, further including a spring positioned between said tilt valve and an interior surface of said housing to bias said tilt valve in the normally closed or sealed position.

4. The pistol air tool in accordance with claim 3, wherein an outer surface of said tilt valve includes an outwardly extending projection and one end of said spring is positioned around said outwardly extending projection on said outer surface of said tilt valve.

5. The pistol air tool in accordance with claim 2, further including a washer fabricated from a resilient material positioned against said sealing surface to block the flow of air into said pistol air tool.

6. The pistol air tool in accordance with claim 2, further including a washer fabricated from urethane positioned against said sealing surface to block the flow of air into said pistol air tool.

7. The pistol air tool in accordance with claim 2, wherein a rear surface of said tilt valve includes a tapered portion which facilitates the flow of air past said tilt valve.

8. The pistol air tool in accordance with claim 2, wherein said tilt valve includes a downwardly extending arm which contacts said actuation rod such that, when said trigger is depressed, said flat tilt valve is opened.

9. The pistol air tool in accordance with claim 1, wherein said housing includes a top air inlet and a bottom air inlet.

10. The pistol air tool in accordance with claim 9, further including a spring positioned between said tilt valve and an interior surface of said housing to bias said tilt valve in the normally closed or sealed position.

11. The pistol air tool in accordance with claim 10, wherein an outer surface of said tilt valve includes an outwardly extending projection and one end of said spring is positioned around said outwardly extending projection on said outer surface of said tilt valve.

12. The pistol air tool in accordance with claim 9, further including a washer fabricated from a resilient material positioned against said sealing surface to block the flow of air into said pistol air tool.

13. The pistol air tool in accordance with claim 9, further including a washer fabricated from urethane positioned against said sealing surface to block the flow of air into said pistol air tool.

14. The pistol air tool in accordance with claim 9, wherein a rear surface of said tilt valve includes a tapered portion which facilitates the flow of air past said tilt valve.

15. The pistol air tool in accordance with claim 9, wherein said tilt valve includes a downwardly extending arm which contacts said actuation rod such that, when said trigger is depressed, said flat tilt valve is opened.

16. The pistol air tool in accordance with claim 1, wherein said housing includes at least two of a top air inlet, a bottom air inlet and a rear air inlet.

17. The pistol air tool in accordance with claim 16, further including a spring positioned between said tilt valve and an interior surface of said housing g to bias said tilt valve in the normally closed or sealed position.

18. The pistol air tool in accordance with claim 16, wherein a rear surface of said tilt valve includes a tapered portion which facilitates the flow of air past said tilt valve.

19. A pistol air tool, comprising:

a housing having multiple air inlets and a downwardly extending handle portion;

a tilt valve positioned in the interior of said housing and having a perimeter including a plurality of outwardly extending projections, said tilt valve is biased in a normally closed or sealed position against a sealing surface to block the flow of air into said pistol air tool and said tilt valve having a downwardly extending arm which is substantially parallel to said sealing surface; and a trigger including an actuation rod which is movable and in contact with said downwardly extending arm such that when said trigger is depressed, said tilt valve is opened to allow the flow of air into said pistol air tool.

20. A pistol air tool, comprising:

a housing having a top air inlet and a bottom air inlet and a downwardly extending handle portion;

a tilt valve positioned in the interior of said housing and having a perimeter including a plurality of outwardly extending projections, said tilt valve is biased in a normally closed or sealed position against a sealing surface to block the flow of air into said pistol air tool and said tilt valve having a downwardly extending arm which is substantially parallel to said sealing surface; and a trigger including an actuation rod which is movable and in contact with said downwardly extending arm such that when said trigger is depressed, said tilt valve is opened to allow the flow of air into said pistol air tool.

* * * * *

UNITED STATES PATENT AND TRADEMARK OFFICE

CERTIFICATE OF CORRECTION

PATENT NO. : 6,491,113
DATED : December 10, 2002
INVENTOR(S) : Kevin Heinrichs

It is certified that error appears in the above-identified patent and that said Letters Patent is hereby corrected as shown below:

<u>Column 6,</u>
Line 11, change "housing g" to -- housing --.

Signed and Sealed this

Twenty-ninth Day of April, 2003

JAMES E. ROGAN
*Director of the United States Patent and Trademark Office*